United States Patent Office 3,322,913
Patented May 30, 1967

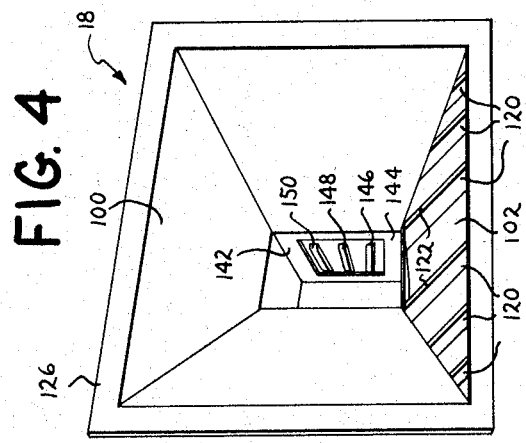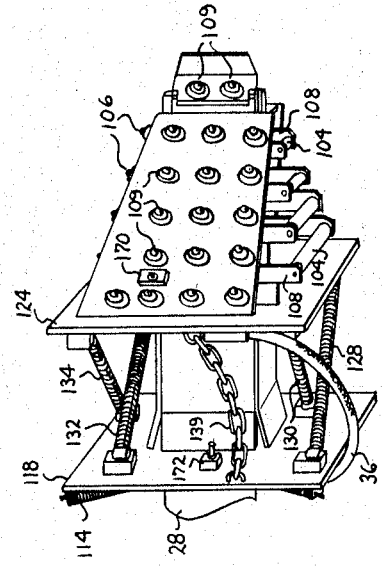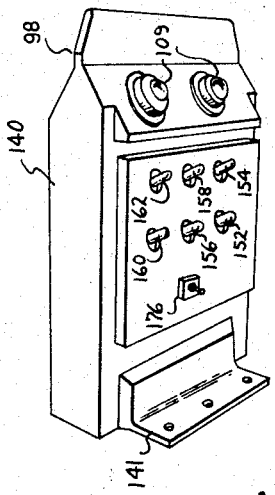

3,322,913
POWER COUPLING MECHANISM
Robert B. Bradstock, Erie, and Hjalmar A. Olson, North East, Pa., assignors to General Electric Company, a corporation of New York
Filed Feb. 17, 1965, Ser. No. 433,427
10 Claims. (Cl. 200—61.42)

This invention relates to a power coupling mechanism for supplying power to a movable object located adjacent thereto. While this invention is subject to a wide variety of applications wherever it is desired to couple either mechanical or electrical power, it is especially suited for coupling electrical power from wayside to railroad cars and will be particularly described in that connection.

In the past it has been customary to require the labor of several men to open and close the unloading doors on railroad hopper-cars. The door release, in its most elementary form, requires the operators to first brace the door from a fixed portion of the car, and then to dislodge pins which held the door in its closed position. The braces are adjusted to permit only a predetermined amount of opening of the door, the opening being adapted to the unloading system capacity. This arrangement for opening the unloading doors involves a considerable number of man hours of work with a significant delay in the opening of the doors after the spotting of the car, even if the doors can be completely opened without the need for a brace. In an improved arrangement, a mechanism is provided whereby the operator by manually turning an easily accessible wheel roates a shaft to open the doors. This method is somewhat quicker than the more elementary method, but it also involves considerable time spent in manually opening the doors. In the latter arrangement the doors could be opened relatively quickly, and with greater ease if for instance an electric motor is provided for rotating the door opening shaft. To unload the hopper-car, it is then only necessary to connect a power source to the electric motor and to energize and de-energize the motor at the proper times.

It may often be desirable in certain hazardous environments, such as extremely high temperatures, high levels of nuclear radiation and the like to provide for the remote coupling of power from a wayside location to a movable object adjacent thereto.

It is an object of this invention, therefore, to provide a remotely operated, self-aligning mechanism capable of supply power, either mechanical or electrical, to a movable object positioned adjacent thereto to cause a specified function to be performed.

It is another object of this invention to provide a power coupling mechanism, which will automatically establish a connection to a railroad car without the need for operators to make the connection manually.

It is another object of this invention to provide a power coupling mechanism which will position a pair of electrical connectors, whereby a connection can be made between a railside power source and a car spotted on the railway.

It is still another object of this invention to provide a power coupling mechanism which will bring about the engagement of an electrical connector located alongside a railway with an electrical connector on a railroad car which is not precisely positioned on the railway with respect to the position of the wayside connector.

It is a further object of this invention to provide a power coupling mechanism which is particularly adapted for making an electrical connection with a railroad car spotted on a railroad track, and which may be controlled by an operator from a remote location.

These objects are accomplished in accordance with one aspect of this invention by providing a self-aligning probe mounted upon the end of a ram, the ram in turn being supported by a rotatable housing located alongside the railway. Further, a receptacle, shaped to receive the probe, is mounted on each railroad hopper-car. With the hopper-car positioned opposite the rotatable housing, the operator actuates the ram from a remote location to move the probe toward the receptacle mounted on the car. The ram support provides two degrees of freedom so that as the probe is forced into the receptacle it aligns itself with the receptacle. Alignment of the probe in the receptacle causes the free end of the ram to be deflected in the horizontal and vertical directions to the extent necessary. After the probe has been seated in the receptacle, additional movement of the ram causes an electrical contact carrying connector to be extended from the tip of the probe. The engagement of this connector with a contact carrying connector mounted at the base of the receptacle, completes an electrical connection between the railroad car and a wayside power source.

The novel features believed characteristic of the invention are set forth with particularity in the appended claims. The invention itself, however, together with further objects and advantages thereof, may best be understood by reference to the following description taken in connection with the accompanying drawings, in which:

FIG. 3 is a detailed perspective view of the probe of the positioning mechanism shown in FIG. 1;

FIG. 4 is a detailed perspective view of the receptacle of the positioning mechanism shown in FIG. 1; and, FIG. 5 is a detailed perspective view of the probe tip and the contacts carried within the probe of the positioning mechanism shown in FIG. 1.

Figure 1:
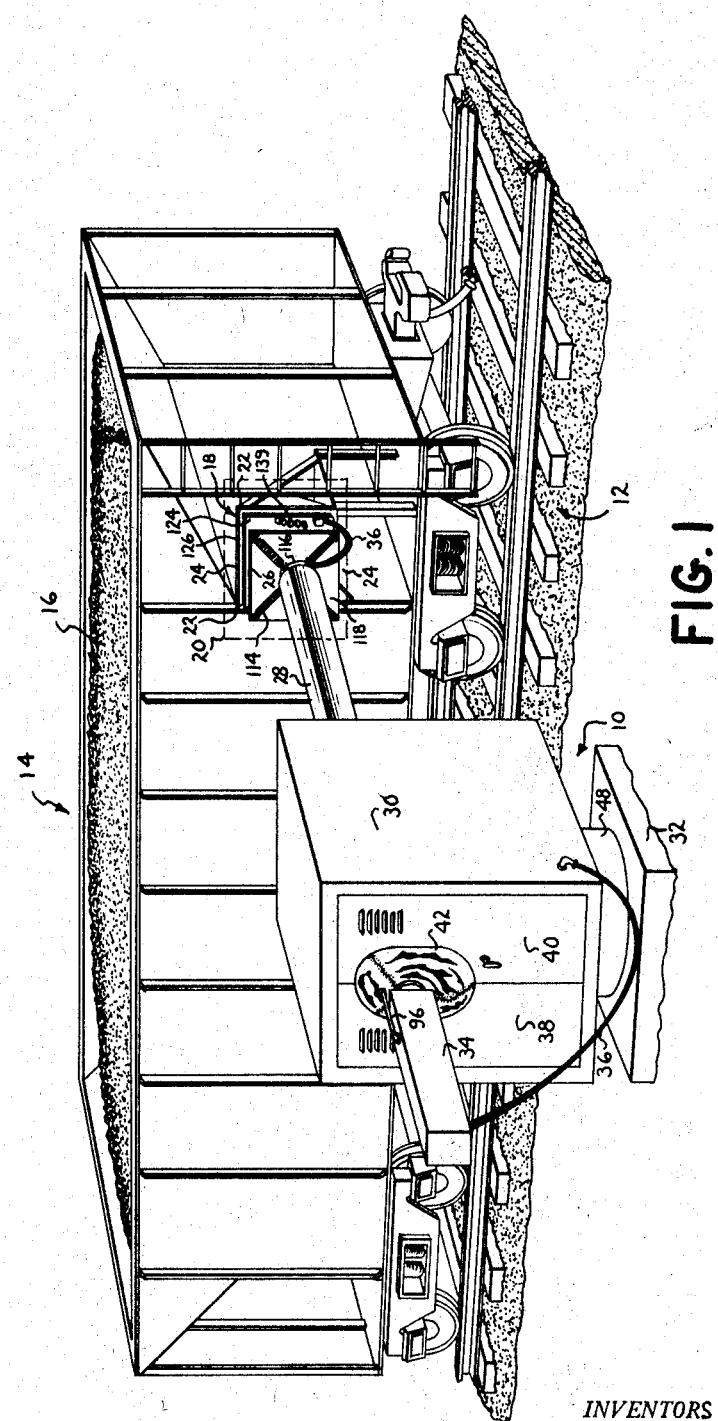
FIG. 1 is a perspective view of a railroad hopper-car provided with a receptacle for reception of a probe of a positioning mechanism constructed in accordance with this invention.

By reference to FIG. 1 of the drawings, it will be seen that in one embodiment of this invention a positioning mechanism 10 is located alongside a railroad track 12. A railroad hopper-car 14 is shown spotted on the railway 12 adjacent the positioning mechanism 10. The hopper-car 14 contains a material 16, such as coal, which is to be unloaded. Means are known in the railway industry for remotely positioning a car in a predetermined position but this positioning may vary within limits which might be as much as plus or minus 18 inches of the desired location. As a result of this variation in the spotting of the car, a car-mounted receptacle connector 18 may be located, depending upon the accuracy of the spotting, anywhere within the rectangle formed by the dotted line 20. It will be noted, that the dotted line is not only horizontally spaced from the vertical edges 22 of the receptacle 18, but is also vertically spaced from the horizontal edges 24. The variation in the vertical location of the receptacle 18 is caused by such things as wheel wear, broken springs, and variations in car loading and spring deflection. For example, it is readily apparent that the receptacle will be at one vertical position when the car is fully loaded and a different vertical position when the car it empty with intermediate positions between loaded and empty cars. Thus the coupling mechanism must not only be capable of effecting a connection at these extremes but must also be capable of rapidly following changes in position so that contact is maintained throughout any such movement.

Also, the mechanism must be capable of accommodating angular misalignment in the vertical direction such as may occur due to a broken spring on one side of a car or unequal loading of a car.

Before referring to the specific mechanism whereby a probe connector 26 is aligned with and positioned in the receptacle 18, the overall structure of the position mechanism will be described. A ram 28, preferably hydraulically operated, is supported within a housing 30. The housing 30 is supported for rotation in a horizontal plane upon a base assembly 32. A portion of a ram mount 34 extends out of the rear of the housing. A power cable 36, which is provided for transmitting power from the housing 30 to the probe 26, is shown extending from the housing 30 to the ram mount 34. The ram mount 34 is pivotally mounted within the housing 30, and therefore the portion of it extending from the rear of the housing is free to move in a vertical plane. While the major portion of the rear of the housing is closed by doors 38 and 40, the portion surrounding the ram mount 34 is closed by a resilient seal 42.

Figure 2:
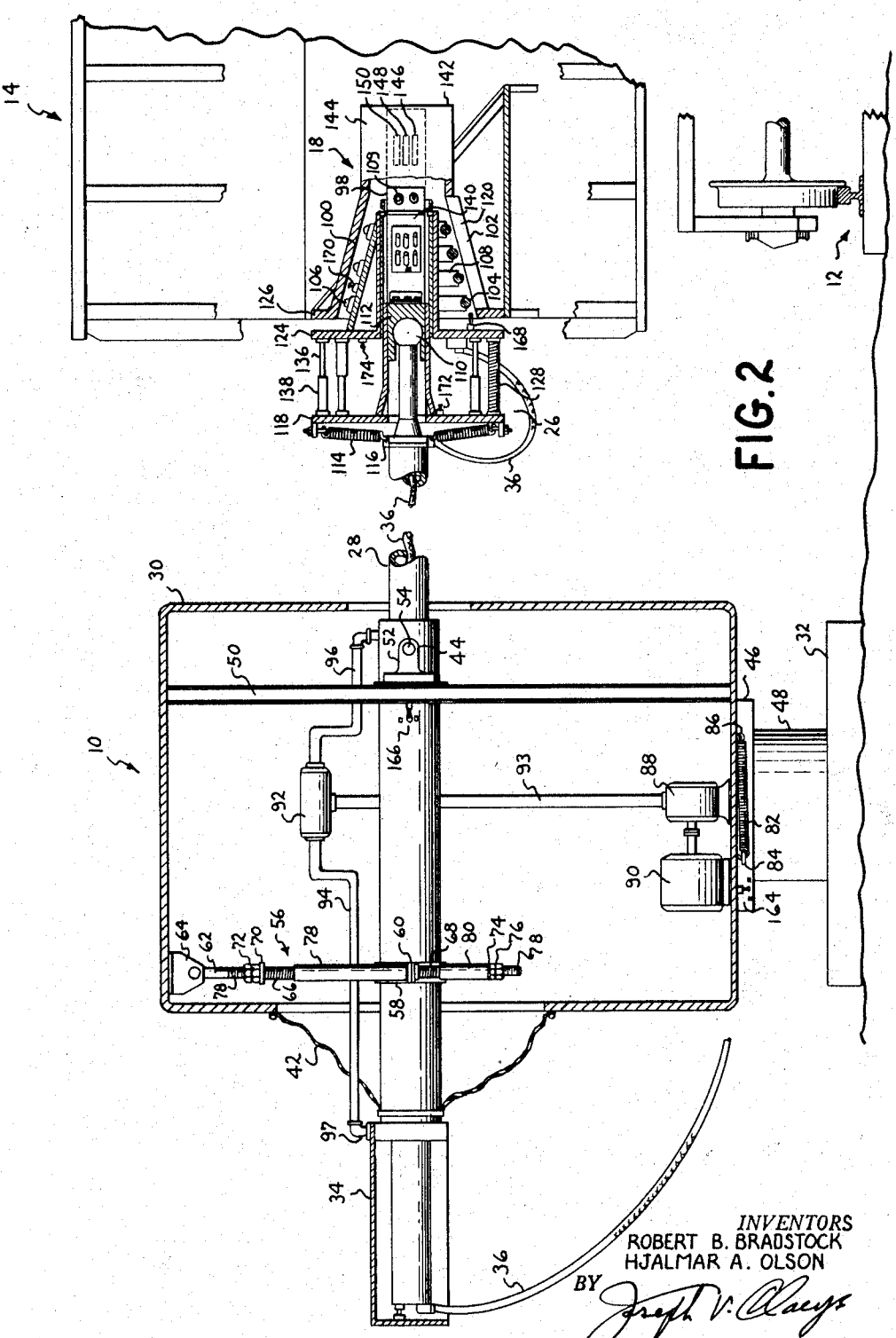
FIG. 2 is a partial sectional view taken along a vertical center line passing through the probe and the receptacle shown in FIG. 1.

The construction of the positioning mechanism 10, and of the car-mounted receptacle 18 are shown in more detail in FIG. 2. In order to provide for vertical and horizontal movement of the probe 26 when it is inserted in the car-mounted receptacle 18, the ram mount 34 is pivotally supported at point 44 within the housing 30, and housing 30 is mounted for rotation on a platform 46 which is supported by a cylindrical portion 48 of the base 32. More particularly, a pair of channels 50, one of which is shown, are provided within the housing 30 for rigidly supporting a pair of bearing blocks 52, one of which is shown. The ram mount 34 is provided with trunnions 54 at point 44, one of which is shown, which are supported by the bearing blocks 52.

The ram housing 34 is held in a horizontal position by a spring support arrangement 56. A collar 58 is provided on the ram mount 34, and includes a pair of mounting extensions 60, one of which is shown. A pair of rods 62, one of which is shown, are pivotally supported by a pair of brackets 64, one of which is shown, from the top of the housing 30. The rod 62 passes freely through a hole in the mounting extension 60. A pair of springs 66 and 68 surround the rod 62, and abut opposite sides of the mounting extension 60. The other end of the spring 66 is abutted against a ring 70 which is positioned on the rod 62 by a pair of nuts 72. Similarly, the other end of the spring 68 is abutted against a ring 74 which is positioned on the rod 62 by a pair of nuts 76. The rod is provided with threads 78, whereby the position of the pairs of nuts 72 and 76 can be changed. A portion of the spring 66 is contained within a cylindrical housing 78, and a portion of the spring 68 is contained within a cylindrical housing 80.

The spring support arrangement 56 provides support of the ram 28 as it is extended. As the ram 28 is extended toward the hopper-car 14, the center of gravity of the ram and ram housing will move to the right of the pivot point 44, toward the hopper-car. This shift in the center of gravity will cause the ram housing 34 to tend to turn clockwise about the pivot point 44. The clockwise movement of the ram and ram housing is limited by spring 66 which must be compressed if the ram is to pivot clockwise about pivot point 44. As the probe 26 is being positioned in the receptacle 18 the vertical position of the probe 26 is adjusted by the pivoting of the ram housing 34 about the pivot point 44, against the spring bias forces of springs 66 and 68. If the receptacle 18 is located in a higher than normal position, the ram housing 34 will be rotated in a counterclockwise direction, compressing spring 68, while if the receptacle 18 should be in a lower than normal position, the ram housing 34 will rotate in a clockwise direction, thereby further compressing spring 66.

The ram 28 is maintained at a right angle to the center line of the railroad track 12 by a pair of springs 82, one of which is shown. One end 84 of spring 82 is secured to the stationary platform 46, while end 86 is secured to the bottom of the housing 30. If the railroad car 14 is located to the right of the position shown in FIG. 1, the spring 82, which is shown, will be extended, or placed in greater tension, while the spring on the opposite side would be shortened, with a reduction in its tension. Similarly, the spring 82 shown in FIG. 2 would be shortened and the spring 82, not shown, would be lengthened if the car, as shown in FIG. 1, were located to the left of the position shown.

The hydraulic system which extends the ram 28 and the probe 26 toward the car-mounted receptacle 18 includes a pump 88 driven by a motor 90. When it is desired to extend the ram 28, the motor 90 is energized so that the pump 88 directs a hydraulic fluid to a control valve 92 through a pipe 93. Control valve 92 is operated so as to direct the fluid flow through the valve to pipe 94, but not to pipe 96. The hydraulic fluid from pipe 94 enters a hydraulic cylinder at point 97. The entrance of fluid into the cylinder causes ram 28 to be extended from the ram mount 34.

If hopper-car 14 is spotted so that the receptacle 18 is within the limits of the dotted line 20 in FIG. 1, a probe tip 98 will enter the receptacle, possibly engaging either the sidewalls of the receptacle 18, its top wall 100, or its bottom wall 102. The probe tip 98 will, if the car is not perfectly centered, guide the probe 26 into the receptacle 18. Depending upon whether the receptacle is located above or below its preferred position, roller bearings 104 extending from the lower surface of the probe 26 will engage the bottom wall 102 of the receptacle, or ball bearings 106 extending from the top surface of the probe 26 will engage the top wall 100 of the receptacle.

The probe 26 and the bearings 104 and 106 are shown in more detail in FIG. 3. The roller bearings 104 are supported from the bottom of the probe 26 by brackets 108. The sidewalls of the probe 26 and the probe tip 98 are provided with ball bearings 109 which are similar to ball bearings 106 on the top surface. Vertical alignment of the probe 26 with the receptacle 18 is brought about by the engagement of the ball bearings 106 with the top wall 100 of the receptacle, or by the engagement of the roller bearings 104 with the bottom wall 102 of the receptacle. Vertical displacement of the probe 26 causes the ram 34 to be pivoted at point 44. The rotation about point 44 is accommodated by the spring arrangement 56 as previously discussed.

While pivoting of the ram mount 34 about point 44 permits the receptacle to assume the proper height, in order for the probe to be properly aligned within the receptacle, it is also necessary to mount the probe on the end of the ram to allow for simple misalignment as well as angular misalignment in the vertical direction. This mounting is provided for by a ball and socket joint interposed between the probe 26 and the ram 28 as best shown in FIG. 2. A ball 110 is secured to the end of the ram, and a socket 112 is secured to the probe 26. The probe 26 is normally held in both horizontal and vertical alignment with the ram 28 by springs 114. Two of these springs, of which there are four, are shown in FIG. 2 extending from a collar 116, which is secured to the ram 28, to the corners of the square plate 118. These springs permit the probe head 26 to pivot about the ball 110, but tend to return the probe 26 to alignment with the ram 28 when it is removed from the receptacle.

Referring to FIG. 4 it will be seen that the top and side walls of the receptacle 18 are formed from solid pieces of metal, while the bottom wall 102 is formed from spaced metal bars 120. By providing the spaced bars 120, foreign material which might otherwise accumulate within the receptacle, such as coal dust, snow, and sleet, passes through the spaces between the bars. The roller bearings 104 which engages the top edges 122 of the spaced bars 120 easily remove any material deposited on the top edges of the bars, thereby insuring proper alignment of the probe 26 in the receptacle 18.

The ram 28 will continue to be extended from the ram mount 34 until a plate 124 of the probe engages a flared outer wall 126 of the receptacle 18. Engagement of the plate 124 with the flared outer wall 126 of the receptacle terminates movement of the pyramid-shaped probe head carrying the bearings 104, 106, and 109. Further extension of the ram 28 causes the plate 118 to move toward the plate 124. These plates are held in a spaced relationship by four compression springs, one of these springs 128 being shown in FIG. 2. All four of the springs 128, 130, 132, and 134 are shown in FIG. 3. Each of these springs is placed over a support formed by a rod 136, and a hollow cylinder 138. The rods 136 are received in the bores of the hollow cylinders 138 in a telescoping arrangement. The rods 136, and the hollow cylinders 138 are pivotally mounted on the plates 118 and 124, so as to permit them to rotate about the pivot points in a horizontal plane. This spring, rod, and cylinder arrangement insures a parallel relationship between the plates 118 and 124. A safety chain 139 is secured to plates 118 and 124 to prevent their separating by too great a distance.

As plate 18 is moved toward plate 124 by further extension of the ram 28, the rods 136 telescope within the cylinders 138, and the springs 128–134 are compressed while at the same time rotating about the pivot points. As plate 118 moves toward plate 124, probe tip 98 and a contact-carrying portion 140 of the probe is projected forward from the pyramid-shaped probe head. The contact-carrying portion 140 is provided with angle-irons 141 which are bolted to the piece of metal forming the socket 112, to secure the contact-carrying portion 140 to the probe 26. Engagement of the contact-carrying portion 140 with contacts mounted in the receptacle, can best be understood by referring to FIGS. 4 and 5. The apex of the pyramidal-shaped receptacle 18 is provided with a rectangular extension 142. One vertical wall 144 of this extension is provided with three electrical contacts 146, 148, and 150. Conductors, not shown, are connected between these contacts and the motors operating the hopper-car dump doors. The probe tip 98 enters into the rectangular extension 142 of the receptacle 18 and guides the contact-carrying portion 140 of the probe into the extension.

Extending from a sidewall of the contact-carrying portion 140 are three pairs of spring-biased contacts, 152–154, 156–158, and 160–162. When the ram 28 is fully extended so that plate 118 has assumed its closest position with respect to plate 124, contacts 152–162 will be in alignment with and making contact with contacts 146, 148 and 150. More specifically, contacts 152 and 154 will engage contact strap 146, contacts 156 and 158 will engage contact strap 148, and contacts 160 and 162 will engage contact strap 150.

In the embodiment of the invention shown, power cable 36, which passes through the hollow cylindrical ram 28, as shown at the broken away portion 164 in FIG. 2, includes three insulated conductors, each terminating in a pair of contacts 152 and 154, 156 and 158, and 160 and 162. Thus, two alternate paths for current flow for each of three circuits are provided between the power cable 36 and the contact straps 146, 148 and 150. This is provided to assure a good electrical contact even in the extremely dirty environment encountered in such an application as herein described. For example, if the contact bars 146, 148 and 150 are extremely dirty one contact of each pair in the probe head may make only very poor electrical contact, however, it will have served to clean the contact bar so that the following contact of the pair is able to make a good electrical contact.

The three circuits as shown are used to supply three-phase A.C. power to energize the motors operating the hopper-car dump doors, however, it will be understood that such a power source has been chosen for illustrative purposes only and other power sources may be employed if desired. It will be appreciated that although the invention has been described in detail for effecting the direct coupling of electrical power to the object, it may be similarly employed to effect such coupling indirectly such as by the use of mating primary and secondary portions of a transformer. In such an application one portion of the transformer would be located in the receptacle and the other portion would be located in the probe with the desired close coupling to provide the desired power transfer being achieved when the probe is positioned in the receptacle as previously described.

Moreover, it will be readily apparent to those skilled in the art that the remotely operated, self-aligning mechanism may be employed to similarly locate and position a torque transmitting shaft. After the shaft is suitably positioned it could then be rotated to actuate the hopper doors or provide any other desired function. In this way no motors would be required on the object. Such equipment would instead be suitably arranged in the power coupling mechanism.

When it is desired, for example, to provide for an indirect electrical coupling such as by the use of mating transformer primary and second portions, the probe is provided with a larger head portion, preferably constructed from a plurality of stacked laminations, having slots provided therein into which the primary transformer windings are disposed. An opening is similarly provided in the receptacle 18 and a suitable laminated core disposed therein upon which the secondary windings are similarly disposed. The core, disposed in receptacle 18, provided with a central opening which is suitably dimensioned to receive the probe head and establish the desired close coupling to effect the large transfer of energy.

Utilizing this arrangement eliminates the need for electrical contacts, and the attendant problems which accompany their use, but, the two portions of the transformer must be accurately positioned with respect to each other before the primary is inserted in the secondary, for the permissible clearance between the two portions may be only a few hundredths of an inch, if efficient energy transfer is to be effected.

Having now described the structure of the positioning mechanism, and its mechanical operation, a typical arrangement for controlling its operation will be discussed.

With a car positioned adjacent the power coupling mechanism 10, as shown in FIG. 1, an operator energizes the motor 90 and actuates the control valve 92 so that the hydraulic fluid from pump 88 is directed through the pipe 94 into the hydraulic ram at the point 96. The ram 28 is then extended and the pyramid-shaped probe head enters the receptacle 18. The probe will continue to be extended, unless the car is not within the plus or minus 18 inches of the center position. If its position should be beyond this, extension of the ram will cause the housing 30 to be pivoted upon the support 46 beyond predetermined limits, whereupon a limit switch 164 is actuated, and causes control valve 92 to be actuated so as to direct fluid through the pipe 96, to retract the ram and thereafter shut off the pump motor 90. Similarly, if the receptacle should be above or below its preferred position, beyond predetermined limits, the excessive pivoting of the ram housing 34 about the point 44 causes limit switch 166 to be actuated, thereby again causing the control valve 92 to be actuated so as to direct fluid through the pipe 96 to retract the ram 28.

If the receptacle is within the predetermined horizontal and vertical limits, the ram continues to be extended until the plate 124 engages the flared wall 126 of the receptacle. The engagement of the wall 124 with the flared wall 126, causes the actuation of limit switch 168, which permits continued energization of the motor 90 and further extension of the ram 28. If the ram has been extended to a position wherein the pyramid-shaped probe head would normally have entered the receptacle 18, but has not yet done so, the actuating member of limit switches 170 mounted on the probe head would not be engaged by the receptacle top wall 100, whereupon a circuit would again energize control valve 92 so as to direct fluid through the pipe 96 to retract the ram 128. This condition would exist, for example, when the ram has completely missed the receptacle 18, and has not hit any other object which might limit its motion.

Further extension of the ram 28 causes the contact-carrying portion of the probe 26 to enter into the rectangular 142 of the receptacle 18. Limit switches 172 and 174 are provided on plates 118 and 124, respectively, which are actuated when the plate 118 has reached its closest position with respect to the plate 124. Actuation of these limit switches causes actuation of valve 92 to cause the hydraulic ram to maintain its position. A limit-switch 176 is provided on the contact-carrying portion of the probe. Engagement of the actuating member of switch 176 with a portion of the rectangular extension 142 of the receptacle 18 causes power to be applied through the power cable 36 to the contacts 152–162. The circuit through the cable 36 remains energized long enough to permit the hopper-car dump door motors to fully open the doors. A time delay circuit is provided to allow the car doors to remain open until the car is empty.

When the car is empty a contractor arrangement is provided wherein the power-phase rotation to the power cable 36 is reversed and the hopper-car dump door motors are energized to run in the opposite direction to shut the doors. When the doors are fully closed current in the motors builds up, and operates contacts which remove power from the motor, and also actuates the control valve 92 so that hydraulic fluid is directed through the pipe 96, to retract the ram.

In the foregoing specification a number of embodiments of the invention for effecting power coupling from a wayside location to a movable object positioned adjacent thereto have been described. As set forth therein the power may be either electrical or mechanical. Also when electrical power is to be coupled, such coupling may be provided by either direct electrical connection or by transformer action. It will be apparent to those skilled in the art, therefore, that the embodiment of the invention illustrated is an example only and that many changes and modifications may be made without departing from the invention in these broader aspects. It is intended, therefore, to cover, in the appended claims, all such changes and modifications as fall within the true spirit and scope of the invention.

What we claim as new and desire to secure by Letters Patent of the United States is:

1. Apparatus for coupling power to a movable object temporarily stationed and nominally positioned at a location adjacent thereto comprising:
    (a) a ram having a major axis;
    (b) a ram mount for supporting said ram to allow movement thereof in a direction along said major axis as well as in both vertical and horizontal directions perpendicular to said major axis;
    (c) a first coupling member mounted on one end of said ram to allow movement of said member independent of said ram in both vertical and horizontal directions perpendicular to said major axis;
    (d) a second coupling member carried by said object and adapted to receive said first coupling member in close mating engagement; and
    (e) means for extending and retracting said ram in a direction along said major axis operative to engage and disengage said first and second coupling members, alignment of said first and second coupling members being effected by a combination of the allowable and independent motions of said ram and the first coupling member mounted thereon.

2. Apparatus for coupling power to a movable object temporarily stationed and nominally positioned at a location adjacent thereto comprising:
    (a) a ram having a major axis;
    (b) a ram mount for supporting said ram to allow movement thereof in a direction along said major axis as well as in both vertical and horizontal directions perpendicular to said major axis;
    (c) a first coupling member mounted on one end of said ram to allow movement of said member independent of said ram, said coupling member being of generally pyramidal configuration with a power coupling means mounted at the apex thereof;
    (d) a second coupling member carried by said object, said member being adapted to receive said first coupling member and having an opening therein formed to receive said power coupling means in close mating engagement;
    (e) and means for extending and retracting said ram in a direction along said major axis operative to engage and disengage said first and second coupling members and the power coupling means thereof, alignment of said first and second coupling members and said power coupling means being effected by a combination of the allowable independent motions of said ram and the first coupling member mounted thereon.

3. The apparatus of claim 2 wherein said power coupling means are electrical contacts.

4. Apparatus for coupling power to a movable object temporarily stationed and nominally positioned at a location adjacent thereto comprising:
    (a) a base assembly;
    (b) a housing rotatably supported on said base assembly so as to be free to rotate about a vertical axis;
    (c) a ram mount pivotally supported on said housing and free to rotate about a horizontal axis;
    (d) a ram carried by said ram mount;
    (e) a first connector member carried by said ram;
    (f) a second connector member carried by said object;
    (g) means for extending and retracting said ram from said ram mount in a direction along said major axis to bring said first connector member into engagement with said second connector member, said first and second connector members being brought into proper mating alignment by rotation of said housing on said base assembly and pivoting of said ram mount on said housing;
    (h) a first power coupling means protectively carried by said ram and at least partially within said first connector member;
    (i) a second power coupling means protectively carried by said object; and
    (j) means for bringing said first and second power coupling means into engagement after said first and second connector members are firmly engaged so that a power coupling is established.

5. Apparatus for coupling power to a movable object temporarily stationed and nominally positioned at a location adjacent thereto comprising:
    (a) a base assembly;
    (b) a housing rotatably supported on said base assembly so as to be free to rotate about a vertical axis;
    (c) a ram mount pivotally supported on said housing and free to rotate about a horizontal axis;
    (d) a ram carried by said ram mount;
    (e) a probe carried by said ram;
    (f) a receptacle carried by said object;
    (g) means for extending said ram from said ram mount to bring said probe into engagement with said receptacle, said probe and receptacle being brought into alignment by rotation of said housing on said base assembly and pivoting of said ram mount on said housing;
    (h) a first electrical connecting means protectively carried within said probe;

(i) a second electrical connecting means protectively carried by said object which is positioned nominally adjacent said base assembly, said connecting means located at the base of said receptacle, and (j) means for protracting said first electrical connecting means from the end of said probe to bring it into engagement with said second electrical connecting means after said probe and said receptacle are firmly engaged so that electrical connections are established between said first and second electrical connecting means.

6. The positioning mechanism defined in claim 5 wherein an interlock is provided between said probe and said receptacle, said interlock preventing the protraction of said first electrical connecting means until after said probe and said receptacle are firmly engaged.

7. The positioning mechanism defined in claim 5 wherein an interlock is provided between said first and second electrical connecting means, said interlock preventing the application of electrical power to said first and second electrical connecting means until after said first and second electrical connecting means are firmly engaged.

8. Apparatus for coupling power to a movable object temporarily stationed and nominally positioned at a location adjacent thereto comprising:

(a) a base assembly;

(b) a housing rotatably supported on said base assembly to allow for free rotation of said housing about a vertical axis;

(c) means for biasing said housing with respect to said base assembly so as to return it to a predetermined position with respect to said base assembly, should it be rotated from this position;

(d) a ram mount pivotally supported on said housing by trunnions so as to be freely rotatable about a horizontal axis;

(e) means for biasing said ram mount with respect to said housing so as to return it to a predetermined position with respect to said housing, should it be pivoted from this position;

(f) a hydraulic ram carried by said ram mount;

(g) a probe carried by said ram, said probe having the shape of a truncated square pyramid;

(h) a receptacle carried by the railroad car which is spotted on the railroad track adjacent said base assembly, said receptacle having a shape substantially conforming to that of said probe;

(i) means for applying hydraulic pressure to said hydraulic ram selectively operative to extend and retract said ram from said ram mount to cause said probe to be engaged and disengaged from said receptacle, said probe and said receptacle being brought into proper mating alignment by rotation of said housing on said base assembly and pivoting of said ram mount on said housing;

(j) a first electrical connecting means protectively carried at least partially within said probe;

(k) a second electrical connecting means protectively carried by the object positioned nominally adjacent said base assembly, said connecting means located at the truncated end of said receptacle; and (l) means for protracting said first electrical connecting means from the truncated end of said probe to bring it into engagement with said second electrical connecting means after said probe and said receptacle are firmly engaged to establish electrical connections between said first and second electrical connecting means.

9. Apparatus for coupling power to a movable object temporarily stationed and nominally positioned at a location adjacent thereto comprising:

(a) a ram having a major axis;

(b) a ram mount for supporting said ram to allow movement thereof in a direction along said major axis as well as in both vertical and horizontal directions perpendicular to said major axis;

(c) a first coupling member having a generally pyramidal configuration mounted on one end of said ram, said coupling member being mounted to allow for movement thereof independent of said ram in both vertical and horizontal directions perpendicular to said major axis;

(d) a power coupling member movably carried within said first coupling member and having at least a portion extending from the apex thereof;

(e) a second coupling member carried by said object and being adapted to receive said first coupling member in close mating engagement, said second coupling member having an opening therein formed to receive said power coupling member in close mating engagement;

(f) means for extending and retracting said ram in a direction along said major axis selectively operative to engage and disengage said first and second coupling members and the power coupling members thereof, alignment of said first and second coupling members being effected by a combination of the allowable independent motions of said ram and the first coupling member mounted thereon;

(g) and means responsive to the extension and retraction of said ram for protracting and retracting the power coupling member of said first coupling member to provide for the engagement and disengagement of said power coupling member from the opening in said second coupling member.

10. The apparatus of claim 9 wherein said power coupling member of said first coupling member and the opening of said second coupling member formed to receive said power coupling member are provided with electrical contacts disposed to be in direct mating contact when said power coupling member is received within said opening.

References Cited

UNITED STATES PATENTS

| | | | |
|---|---|---|---|
| 2,791,338 | 5/1957 | Saint-André | 214—16.1 |
| 2,913,713 | 11/1959 | Bertrand | 340—359 |
| 2,942,736 | 6/1960 | Landsiedel et al. | 212—21 |
| 3,053,948 | 9/1962 | Figenshau et al. | 200—61.42 |
| 3,180,949 | 4/1965 | Rosenston | 200—47 |

BERNARD A. GILHEANY, *Primary Examiner.*

H. B. GILSON, *Assistant Examiner.*